(12) United States Patent
Carney

(10) Patent No.: US 10,549,171 B2
(45) Date of Patent: Feb. 4, 2020

(54) EYES ON GOLF TRAINING AID AND METHOD

(71) Applicant: John M. Carney, Encinitas, CA (US)

(72) Inventor: John M. Carney, Encinitas, CA (US)

(73) Assignee: JMC VENTURES, L.L.C. of DELAWARE, Carlsbad, CA (US)

( * ) Notice: Subject to any disclaimer, the term of this patent is extended or adjusted under 35 U.S.C. 154(b) by 0 days.

(21) Appl. No.: 16/501,816

(22) Filed: Jun. 12, 2019

(65) Prior Publication Data
US 2019/0388762 A1 Dec. 26, 2019

Related U.S. Application Data

(60) Provisional application No. 62/763,548, filed on Jun. 20, 2018.

(51) Int. Cl.
*A63B 69/36* (2006.01)

(52) U.S. Cl.
CPC .. *A63B 69/3676* (2013.01); *A63B 2069/3682* (2013.01); *A63B 2220/80* (2013.01)

(58) Field of Classification Search
USPC ........ 473/212–216, 206, 131, 190, 198, 407
See application file for complete search history.

(56) References Cited

U.S. PATENT DOCUMENTS

| 4,869,509 | A | 9/1989 | Lee | |
|---|---|---|---|---|
| 8,409,024 | B2 * | 4/2013 | Marty | A63B 24/0003 473/150 |
| 8,896,626 | B2 * | 11/2014 | Kawai | G11B 27/034 345/629 |
| 2002/0173364 | A1 * | 11/2002 | Boscha | A63B 69/3617 473/131 |
| 2007/0082325 | A1 * | 4/2007 | Novosel, Sr. | A63B 69/3608 434/252 |
| 2012/0295725 | A1 * | 11/2012 | Peters | G09B 19/0038 473/222 |
| 2015/0087446 | A1 * | 3/2015 | Dyer | G06K 9/00342 473/422 |
| 2016/0292509 | A1 * | 10/2016 | Kaps | G06K 9/00718 |

OTHER PUBLICATIONS

Christopher Mims, The Next MacBook Might Have a Phone Inside, Newpaper Article, Saturday/Sunday, Jun. 16-17, 2018, B4 Technology, Wall Street Journal, US.

\* cited by examiner

*Primary Examiner* — Nini F Legesse

(57) ABSTRACT

A device and method for aiding an improvement of a golfer's swing with the goal of teaching the golfer to keep the golfer's head down until a fraction of a second after making contact with the golf ball. The golfer loads a customizable app into a smartphone placed on the ground a short distance from the golf ball which app flashes a symbol or color on the touch screen of the smartphone a preset time after detecting the sound of the club impacting the ball. The eyes of the golfer are trained on the smartphone forcing the head to remain looking down until observing the flashing symbol or color upon which the head is then turned upward to observe the path of the struck golf ball.

20 Claims, 7 Drawing Sheets

EYES ON GOLF TRAINING AID AND METHOD

CROSS REFERENCE TO RELATED APPLICATION/INCORPORATED BY REFERENCE

This application makes reference to, claims priority to, and claims the benefit of U.S. Provisional Application 62/763,548 filed Jun. 20, 2018 entitled "Eyes on Golf Training Aid And Method". The above stated application is hereby incorporated by reference in its entirety.

FIELD OF THE INVENTION

The present invention relates to an app used with a smartphone to condition a golfer to maintain the golfer's head down until after the golf ball is struck by swinging of the golf club to thereby improve distance and avoid unwanted hook/slice shots.

BACKGROUND OF THE INVENTION

The golfer by training to maintain a still or quiet head during the swinging motion, especially at impact and fractions of a second post impact, will achieve the goal of a cleaner swing of the golf club and increased consistency on solid club-to-ball contact. Many devices, some worn by the golfer, have been proposed in the past for such purpose. One example is U.S. Pat. No. 4,869,509 to Sung Y. Lee entitled "GOLFER'S HEAD MOVEMENT INDICATOR" issued Sep. 26, 1989. The present invention provides for an inexpensive way to aid the golfer in breaking a bad head turning habit and develop better and more consistent body control during the swinging of the club.

OBJECTS AND SUMMARY OF THE INVENTION

It is an object of the present invention to provide a customizable "eyes on golf" app loadable on a smartphone which app in conjunction with a sound detector/sensor detects the audible impact of the swinging club impacting the golf ball. The app allows input of a preselected time delay of fractions of a second to visually signal the golfer when to turn the golfer's head upward to follow the path of the struck ball.

It is another object of the present invention to provide the visual signal either as a flashed or flashing symbol or color. The golfer customizes the app by selecting from symbols such as a large triangle, cross or circle or a particular flashing color.

It is another object of the present invention to allow the golfer through use of the app to customize the sensitivity of the smartphone to accurately pickup the sound of impact within a range of decibel readings to overcome background noise levels or detect the quieter impact sound of a putting stroke.

It is a further object of the invention to provide the app with a customizable time visibility duration for the flashing signal to be observable.

It is a further object of the invention to provide the app with a customizable lineage latency duration for the symbol or color selected.

It is a further object of the invention to provide the app with a delayed screen confirmation of the actually signal flashed so as confirm the color or symbol previously flashed which introduces an element of accountability to prevent guessing by the golfer.

It is a further object of the invention to provide the app with an automatic reset program.

BRIEF DESCRIPTION OF THE DRAWINGS

FIG. 2 is a perspective view of the golfer on a putting green impacting the ball with head down and eyes fixed on the adjacent smartphone waiting for the signal to flash on.

DETAILED DESCRIPTION OF THE INVENTION

Figure 1:
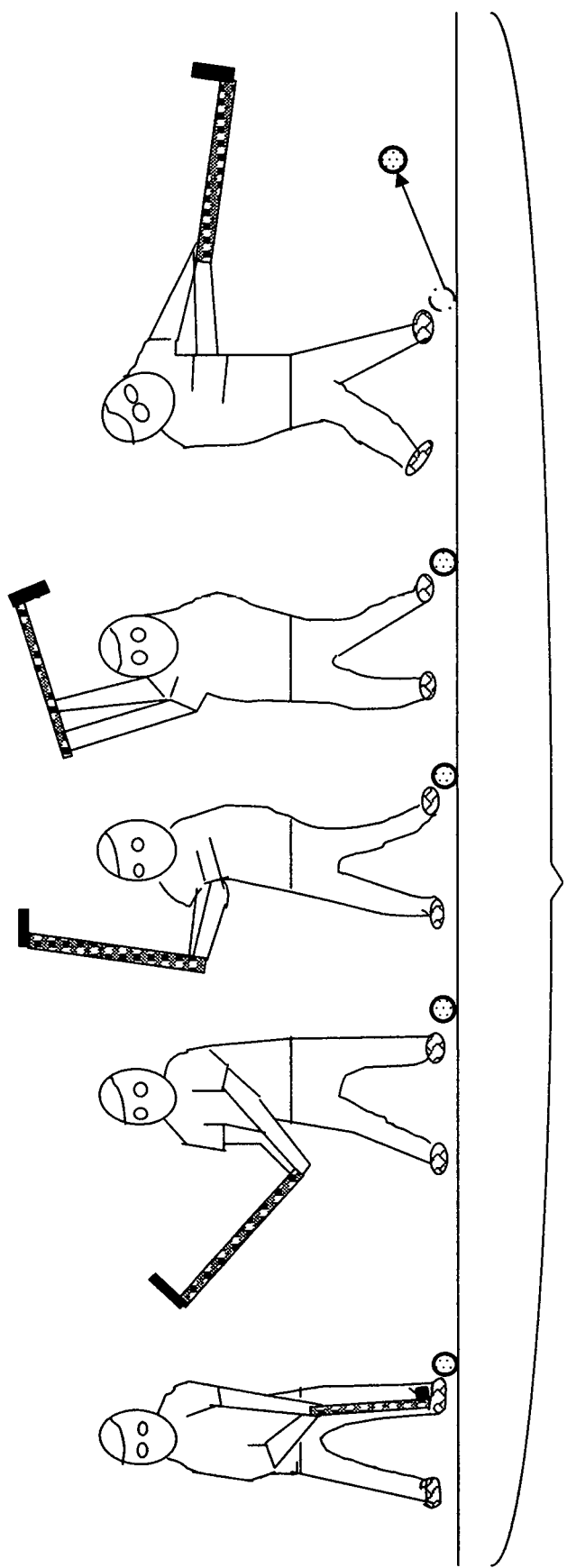
FIG. 1 is a five sequence view of a properly executed golf back swing on a fairway showing the correct downward looking positioning of the golfer's head throughout the swinging of the golf club.

As can be appreciated by golfing athletes, a properly executed golf back swing shown in the five sequence views of an over the head back swing tee shot depicted in FIG. 1 is a complex interplay of various body part motions ranging from the proper feet spread to the hand grip, movements of the wrists, arms and elbows, the timing of shifting of body weight to the forward facing foot and club follow through upon contacting the golf ball. Ideally, the golfer's head is maintained in a quiet downward looking position in the five sequence views of FIG. 1.

Figure 1A:
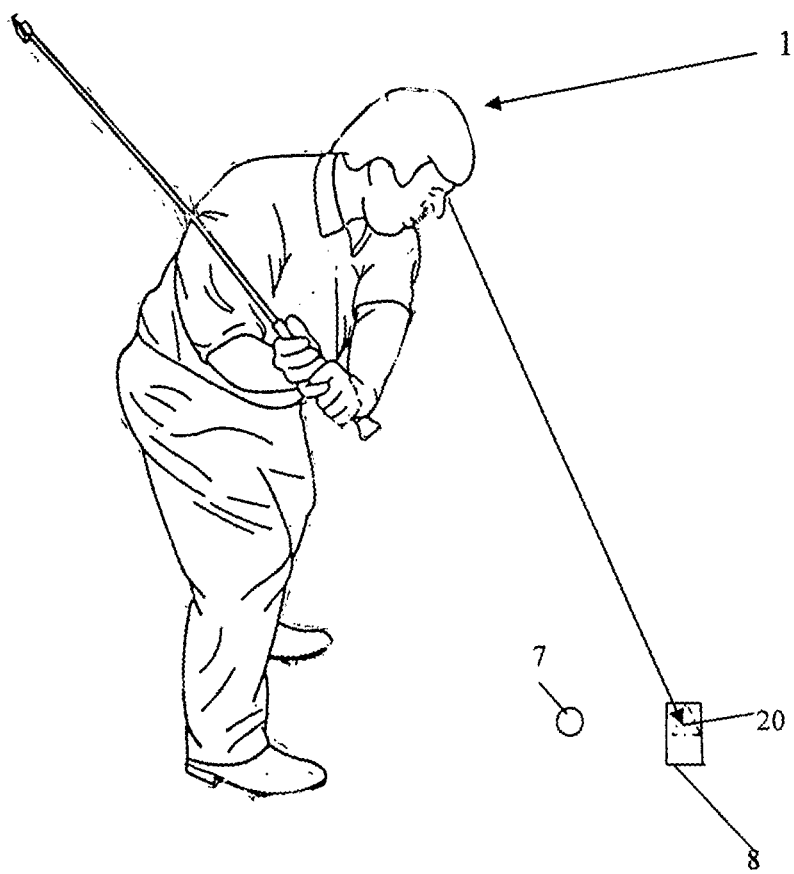
FIG. 1A is a perspective view of the middle sequence of FIG. 1 detailing the position of the golfer relative to the position of the golf ball and the close proximity of the smartphone.
Figure 4:
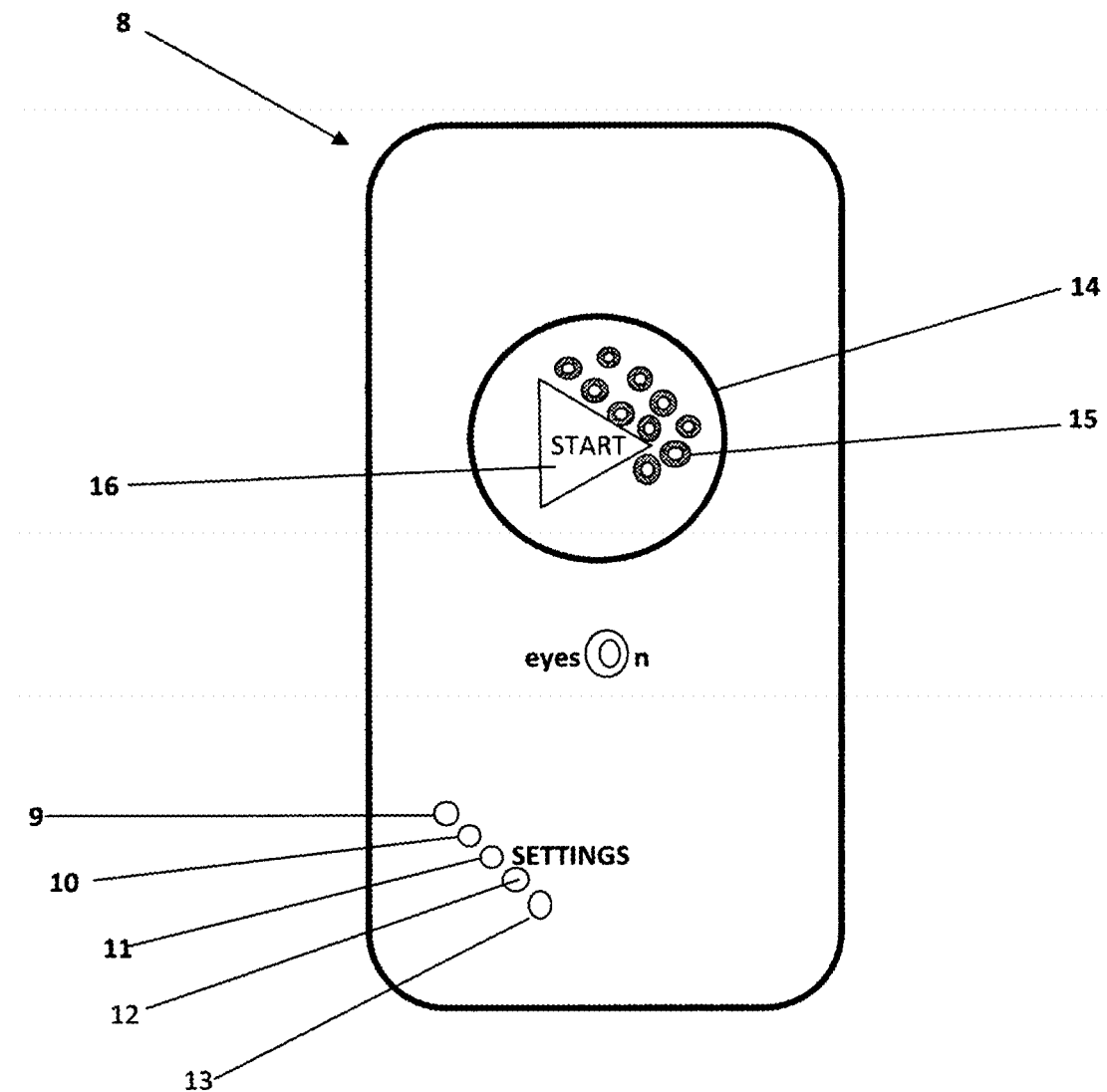
FIG. 4 is a plan view of the start button for the app loaded in the smartphone showing a choice of settings buttons for the app on the touch screen of the smartphone.

FIG. 1A is a perspective view of the golfer shown in the middle sequence of FIG. 1 of raising the golf club just above the golfer's head. Prior to addressing the golf ball in the first sequence of FIG. 1, the golfer has turned on the "eyes on golf" app loaded in the smartphone 8 (also know as a cell phone or cellular phone) using the start button 16 (a figure swipe type button common to smartphones) shown in FIG. 4. The start button 16 is presented against the background of a golf ball 14 having dimples 15.

The preferred type of smartphone 8 being used compatible with the "eyes on golf" app is a Apple® iPhone having an iOS (iPhone Operating System) of 4.3 or higher. The golfer then figure swipes on the settings screen shown in FIG. 5 to customize from the settings 10 for a menu of colors, or settings 11 for a shape or symbol menu such as those shown in FIG. 6 identified on the screen of the smartphone 8. In FIG. 1A a triangular symbol 20 is shown in phantom as the golfer has yet to strike the golf ball.

Figure 2:
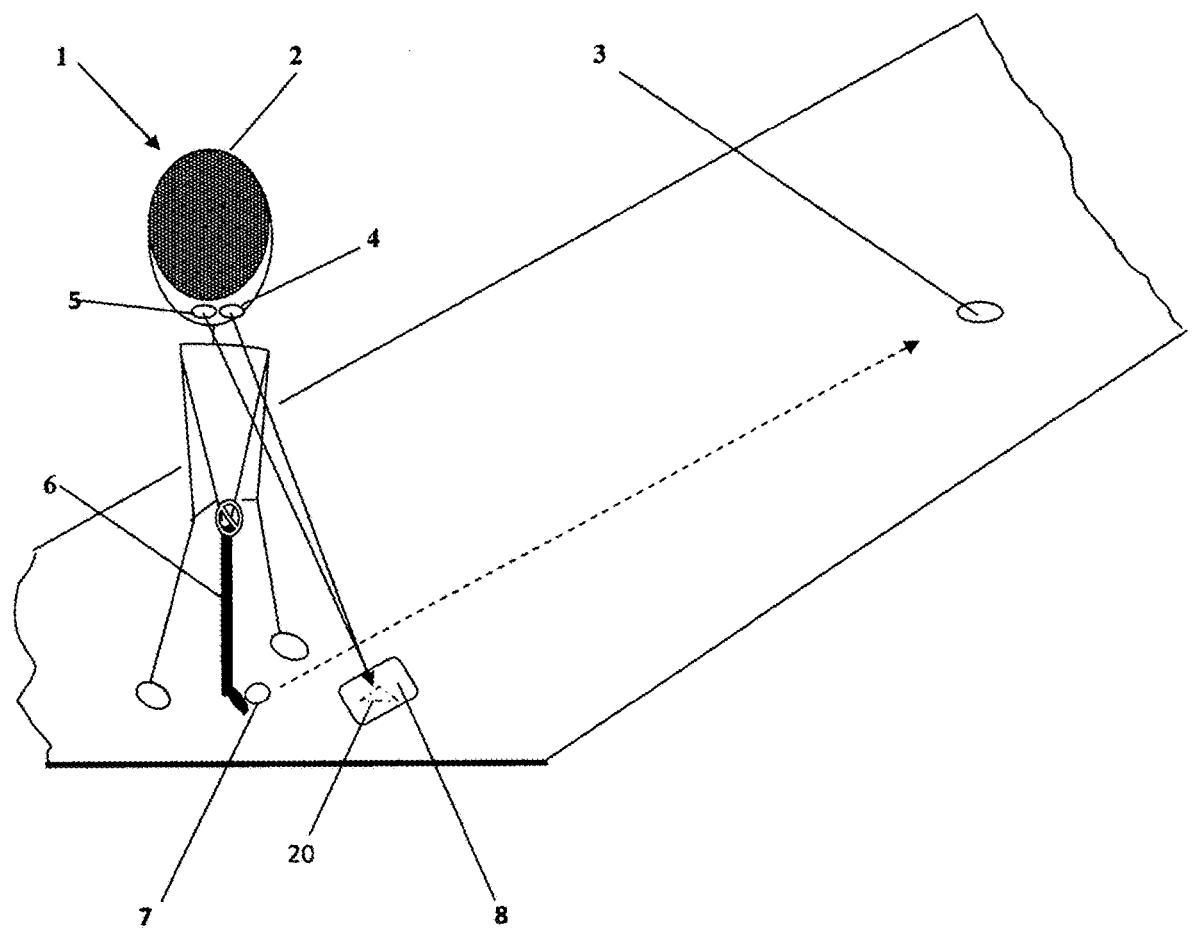

FIG. 2 depicts a golfer 1 on a putting green wearing a golf cap 2 in the act of striking the ball 7 with a putter 6 to propel golf ball 7 towards the putting hole 3. The golfer's eyes 4, 5, without head movement, are looking down and are waiting for the latent symbol selected as a triangle to appear. (FIG. 2 depicts the latent symbol as a phantom line triangle.)

The golfer has previously placed the smartphone 8 about 5 inches on the far side of the golf ball 7.

Figure 3:
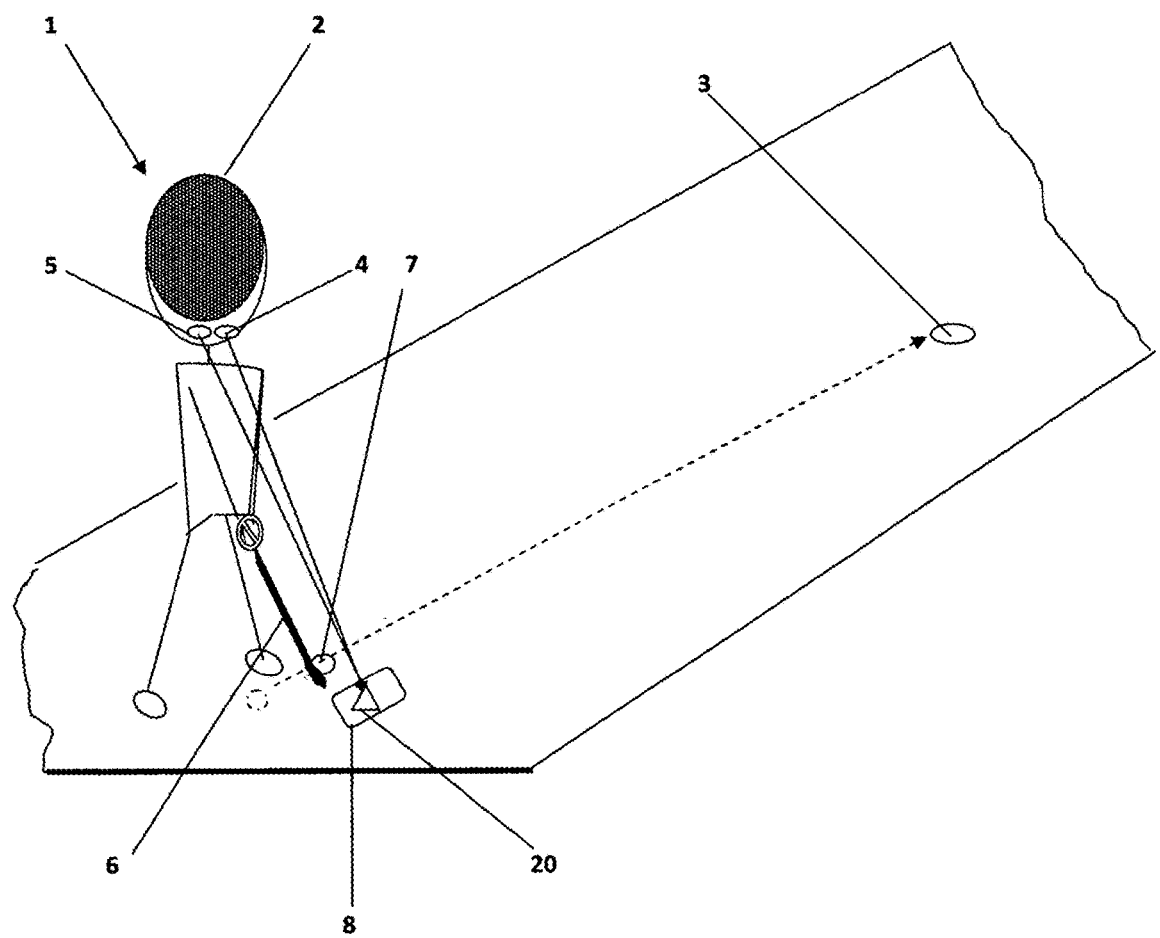
FIG. 3 is a perspective view of the golfer viewing the flashed signal on the smartphone while maintaining head down and quiet but continuing with a follow through of swinging the club on a putting green.

FIG. 3 depicts the movement of the golf ball 7 a fraction of a second after being struck at which time the latent triangle 20 is flashed as a solid symbol. Upon the golfer seeing the symbol the head of the golfer is raised as part of the follow through swing to observe the flight or travel path of the golf ball.

Figure 5:
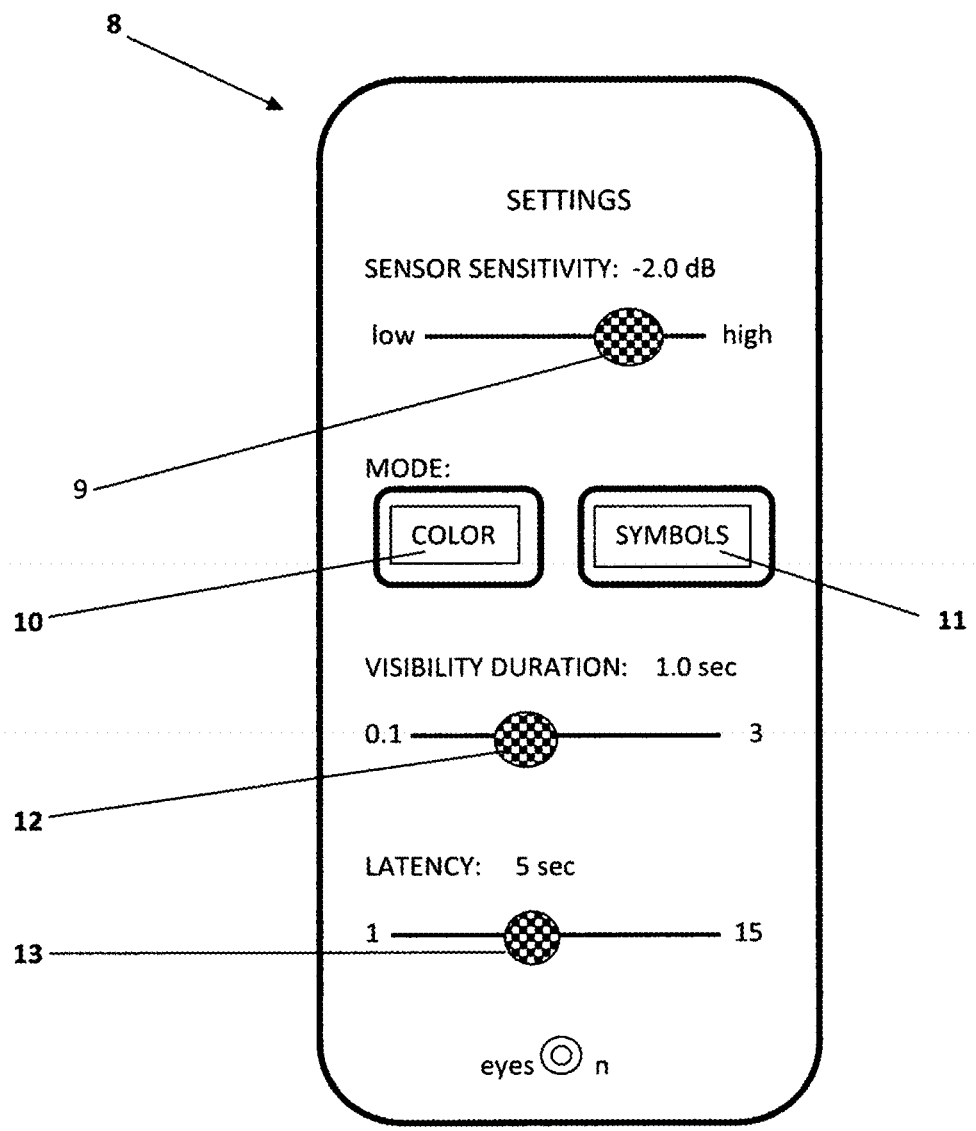
FIG. 5 is a plan view of the turned on touch screen of the smartphone showing choices of customized settings provided by the app loaded in the smartphone.
Figure 6A:
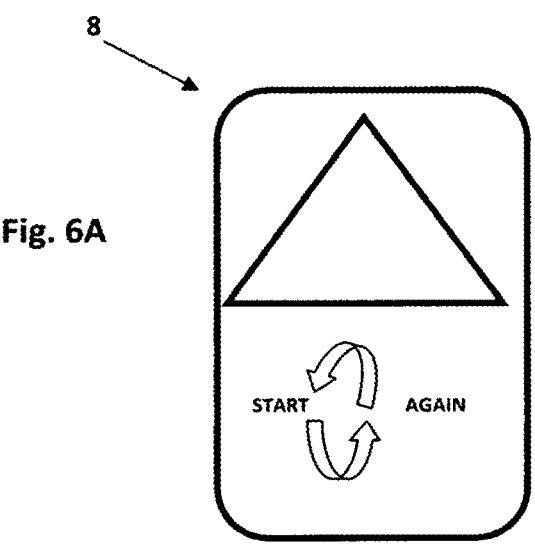
FIGS. 6A-6C are respective plan views of the touch screen of the smartphone showing three selectable symbols, a triangle, a cross, and a circle activated by the app shortly after detecting the impact of the golf club driver head with the golf ball which are then activated to flash on signaling the watching golfer.
Figure 6B:
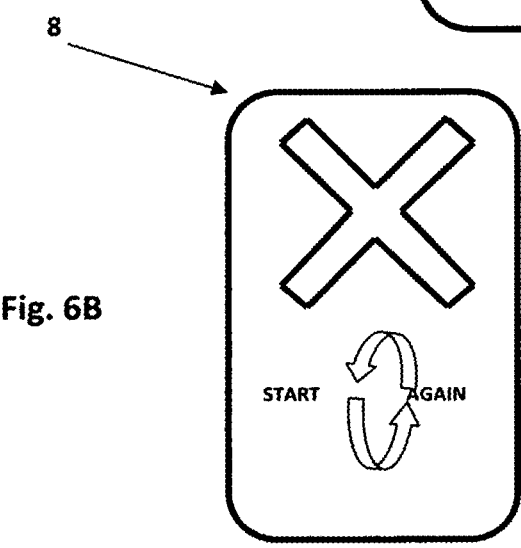
Figure 6C:
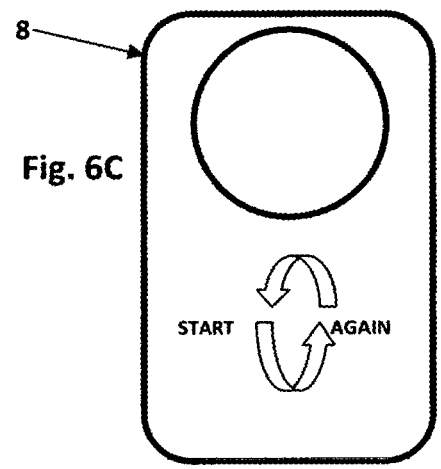

As shown in FIG. 5 the golfer will also select a decibel sensitivity range between low and high favoring high sensitivity if putting as this will make a very low impact sound (barely audible) as compared with a high impact sound generated by a tee shot (in the range of 84-95 dBA (A stands for the logarithmic scale A commonly used to measure audible decibels). The golfer swipes a finger moving button 9 along a scale ranging from low to high. The selected decibel sensitivity is shown to the golfer on the screen as 2.0 decibels.

The golfer also has the option to customize the visibility duration that the selected color or symbol will appear by swiping a finger on the button 12. In FIG. 5, al 0.0 second duration has been selected from a 1-3 second range.

The selected color or symbol will temporarily disappear and then reappear. The golfer optimizes the time passing before reappearance by swiping a finger on button 13. The time passing before the reappearance duration having a 1-15 second range referred to as latency is selected in FIG. 5 to be 5 seconds after striking the golf ball 7. The golfer having tracked the flight of the golf ball looks at the screen to confirm it shows the previously flashed color or symbol. This confirmation aids in preventing guessing as to when to turn the golfer's head. After confirmation, the "eyes on golf" app will automatically reset and show a start again screen message along with the two start again arrows shown in FIGS. 6A-6C.

In summary, the golfer, after loading the app in the smartphone, simply touches the "eyes on golf" app start button, chooses the selection of colors or shapes, and then places the smartphone about 5 inches on the far side of the golf ball. Next, as a golf tee shot, chip or putt is conducted by contacting the golf ball, the "eyes on golf" app will flash a color or shape within a split second after contact. The golfer's objective is to recognize the color or shape before allowing the head of the golfer to follow the flight of the golf ball. If the golfer does not see the color or shape flashed this means the golfer's head and eyes came up to quickly . . . therefore, not a still or quiet head. After the golf ball has finished its flight, the golfer can look back down at the smartphone and the app will confirm the color or shape that flashed.

The settings illustrated in FIG. 5 permit the golfer to customize the training aid features offered by the "eyes on golf" app.

It is to be understood by those skilled in the art of golf training aids that the use of the app with a cell phone or smartphone is not to be limited but also encompasses similar hand held "smart devices" such as by way of example smartphones using the Android® operating systems, iPads, tablets, phablets and iPod Touch® and foldable screen tablets called a "phoneblet" manufactured by BOE. The term "smart device" refers to any portable hand held digital electronic device having a viewing screen. In a alternative embodiment (not shown), mobile chips for state of the art smartphones are integrated with an advanced design laptop, such as Google's Chrome OS and laptops running Microsoft Windows. Apple, Inc. is developing similar mobile chips for their use in tablets, such as MacBook. Such laptop mobile processors rely on the ever reducing size of the circuitry on a microchip, known as a process node. Each new silicon breakthrough is named after the ever smaller distance between certain chip components measured in nanometers. Chip fabricator TSMC produces chips at the 7-nanometer level. Advanced design laptops all aim for the 5G network connectivity as do all advanced smartphones.

While the invention has been described as having preferred design, it is understood that it is capable of further modification, use and/or adaptations following in general the principles of the invention and including such departures from the present disclosure as come within known or customary practice in the art to which it pertains, and as may be applied to the essential features set forth, and fall within the scope of the invention or limits of the appended claims.

What is claimed is:

1. A golf aid used to train a golfer to keep the head of the golfer down to view a screen of a cellular phone placed on the ground a short distance away to wait for a signal from the cellular phone to turn the head of the golfer a split second after striking a golf ball with a golf club wherein the golf aid comprises the combination of:

a cellular phone and a customized app loaded in the cellular phone;

the cellular phone having a viewable touch screen;

the customized app having a sound sensor capable of detecting the impact sound of the golf club striking the golf ball;

the customized app having a setting to show the signal on the viewable screen which setting provides the golfer with a choice of one of a menu of colors or a menu of symbols;

the setting flashes on the viewable touch screen the signal in the form of the chosen color or symbol a fraction of a second after the sound sensor detects the impact of the golf club striking the golf ball.

2. The golf aid of claim 1 wherein the cellular phone is a smartphone using one of an Apple® iPhone Operating System (iOS) or an Android Operating System.

3. The golf aid of claim 2 wherein the iOS of the smartphone is 4.3 or higher.

4. The golf aid of claim 3 wherein the customized app further includes a sensor sensitivity scale allowing the golfer to finger swipe a control button viewable on the viewable screen to select a desired decibel sensitivity for the signal selected from the logarithmic decibel A scale (dBA).

5. The golf aid of claim 4 wherein the selected decibel sensitivity is shown on the viewable screen as a numeric number.

6. The golf aid of claim 2 wherein the customized app further includes a visibility scale allowing the golfer to finger swipe a control button viewable on the viewable screen to select a visibility time for the signal having a duration range of 0.1 to 3 seconds.

7. The golf aid of claim 6 wherein the selected visibility time is shown on the viewable screen as a numeric number.

8. The golf aid of claim 2 wherein the customized app further includes a latency scale allowing the golfer to finger swipe a control button viewable on the viewable screen to select a time delay before the color or symbol previously flashed is repeated to confirm which color or symbol was originally flashed to discourage guessing by the golfer.

9. The golf aid of claim 8 wherein the latency scale has a range of 1 to 15 seconds after the flashed signal appeared.

10. The golf aid of claim 8 wherein the latency scale time delay is shown on the viewable screen as a numeric number.

11. The golf aid of claim 10 wherein the app automatically resets after presenting the latency scale time delay numeric number.

12. The golf aid of claim 11 wherein the app presents a start again message on the viewable screen after the reset.

13. The golf aid of claim 2 wherein the short distance is 5 to 6 inches.

14. The golf aid of claim 2 wherein the setting for selecting the signal is controlled by touch.

15. The golf aid of claim 2 wherein the symbol is one of a large X, a large triangle, or a large circle.

16. A golf aid used to train a golfer to keep the head of the golfer down to view a touch screen of a mobile smart device incorporating mobile chips used in smartphones placed on the ground a short distance away to wait for a signal from the mobile smart device to turn the head of the golfer a split second after striking a golf ball with a golf club wherein the golf aid comprises the combination of:
- a mobile smart device and a customized app loaded in the mobile smart device;
- the mobile smart device having a viewable touch screen;
- the mobile smart device having a sound sensor controlled by the customized app capable of detecting the impact sound of the golf club striking the golf ball;
- the customized app having a setting to show the signal on the viewable touch screen which setting provides the golfer with a choice of one of a menu of colors or a menu of symbols;
- the setting of the customized app controlling flashing of the signal on the viewable touch screen in the form of the chosen color from the menu of colors or symbol from the menu of symbols a fraction of a second after the sound sensor detects the impact of the golf club striking the golf ball.

17. The golf aid of claim 16 wherein the smart device is one of a tablet having 7-nanometer level microchips or a phoneblet having a 7.5 inch foldable screen.

18. The golf aid of claim 16 wherein the smart device is a digital cellular smartphone having 5G connectivity.

19. The golf aid of claim 16 wherein the setting of the customized app controls the time duration of the initial flashed signal and a delayed time duration which repeats the chosen color or symbol as a check to discourage guessing the wrong color or symbol.

20. A golf aid used to train a golfer to keep the head of the golfer down to view a touch screen of a mobile digital smart device incorporating chips used in smartphones placed on the ground a short distance away to wait for a signal from the mobile digital smart device to turn the head of the golfer a split second after striking a golf ball with a golf club wherein the golf aid comprises the combination of:
- a mobile digital smart device and a customized app loaded in the mobile digital smart device:
- the mobile digital smart device having a viewable touch screen;
- the mobile digital smart device having a sound sensor controlled by the customized app capable of detecting the impact sound of the golf club striking the golf ball;
- the customized app having a setting to show the signal on the viewable touch screen which setting provides the golfer with a choice of one of a menu of colors or a menu of symbols;
- the setting of the customized app controlling flashing of the signal on the viewable touch screen a fraction of a second after the sound sensor detects the impact of the golf club striking the golf ball.

* * * * *